United States Patent
Stache et al.

(10) Patent No.: US 10,633,555 B2
(45) Date of Patent: *Apr. 28, 2020

(54) ISOCYANATOALKYL ALKOXYSILANE ADDUCTS MODIFIED BY SILICONE RESINS AND THE USE THEREOF

(71) Applicant: Evonik Operations GmbH, Essen (DE)

(72) Inventors: Wiebke Stache, Herten (DE); Markus Hallack, Schermbeck (DE); Annegret Lilienthal, Dorsten (DE); Sina Ballauf, Duisburg (DE); Tina Bauer, Gelsenkirchen (DE); Ralf Klawikowski, Recklinghausen (DE); Thomas Klotzbach, Seligenstadt (DE)

(73) Assignee: Evonik Operations GmbH, Essen (DE)

( * ) Notice: Subject to any disclaimer, the term of this patent is extended or adjusted under 35 U.S.C. 154(b) by 112 days.

This patent is subject to a terminal disclaimer.

(21) Appl. No.: 15/763,622

(22) PCT Filed: Sep. 29, 2016

(86) PCT No.: PCT/EP2016/073218
§ 371 (c)(1),
(2) Date: Mar. 27, 2018

(87) PCT Pub. No.: WO2017/055418
PCT Pub. Date: Apr. 6, 2017

(65) Prior Publication Data
US 2019/0048224 A1 Feb. 14, 2019

(30) Foreign Application Priority Data
Sep. 30, 2015 (EP) ..................... 15187571

(51) Int. Cl.
| | |
|---|---|
| C08G 18/10 | (2006.01) |
| C08G 18/16 | (2006.01) |
| C08G 18/32 | (2006.01) |
| C08G 18/61 | (2006.01) |
| C08G 18/71 | (2006.01) |
| C08G 77/00 | (2006.01) |
| C08G 77/18 | (2006.01) |
| C08G 77/388 | (2006.01) |
| C08L 83/06 | (2006.01) |
| C08L 83/08 | (2006.01) |
| C08L 83/14 | (2006.01) |
| C09D 7/63 | (2018.01) |
| C09D 175/04 | (2006.01) |
| C09D 183/08 | (2006.01) |
| C09J 11/06 | (2006.01) |
| C09J 175/04 | (2006.01) |
| C09K 3/10 | (2006.01) |

(52) U.S. Cl.
CPC ........... *C09D 175/04* (2013.01); *C08G 18/10* (2013.01); *C08G 18/168* (2013.01); *C08G 18/3203* (2013.01); *C08G 18/61* (2013.01); *C08G 18/718* (2013.01); *C08G 77/18* (2013.01); *C08G 77/388* (2013.01); *C08G 77/70* (2013.01); *C08L 83/06* (2013.01); *C08L 83/08* (2013.01); *C08L 83/14* (2013.01); *C09D 7/63* (2018.01); *C09D 183/08* (2013.01); *C09J 11/06* (2013.01); *C09J 175/04* (2013.01); *C09K 3/1021* (2013.01)

(58) Field of Classification Search
CPC .. C08G 18/718; C08G 18/3203; C08G 18/10; C08G 18/168; C08G 18/61; C08G 77/388; C08G 77/18; C08G 77/70; C08L 83/06; C08L 83/14; C08L 83/08; C09D 175/04; C09D 183/08; C09D 7/63; C09J 11/06; C09J 175/04; C09K 3/1021
See application file for complete search history.

(56) References Cited

U.S. PATENT DOCUMENTS

| | | | |
|---|---|---|---|
| 4,772,672 A | 9/1988 | Isozaki et al. | |
| 5,516,559 A | 5/1996 | Roeckrath et al. | |
| 6,013,326 A | 1/2000 | Flosbach et al. | |
| 2008/0245999 A1 | 10/2008 | Poppe et al. | |
| 2009/0326146 A1 | 12/2009 | Sepeur et al. | |
| 2010/0143596 A1 | 6/2010 | Groenewolt et al. | |
| 2010/0179281 A1 | 7/2010 | Nilsen | |
| 2013/0137037 A1 | 5/2013 | Yamanaka et al. | |

(Continued)

FOREIGN PATENT DOCUMENTS

| | | |
|---|---|---|
| DE | 23 56 768 | 1/1975 |
| DE | 34 12 648 | 10/1985 |
| DE | 195 29 124 | 11/1996 |

(Continued)

OTHER PUBLICATIONS

Abate et al., Photoreactive coating for high-contrast spatial patterning of microfluidic device wettability, Lab on a Chip, vol. 8, No. 12, 2008, p. 2157-2160.

(Continued)

*Primary Examiner* — Patrick D Niland
(74) *Attorney, Agent, or Firm* — Grüneberg and Myers PLLC

(57) ABSTRACT

A binder that can be used in a paint composition, an adhesive composition, and/or a sealant composition. The binder includes a reaction product formed from an adduct (A) of an isocyanatoalkylalkoxysilane (A1) and an alcohol (A2) with an alkoxysilane-containing Q unit-free alkyl- and/or arylsilicone resin (B).

16 Claims, No Drawings

(56) References Cited

U.S. PATENT DOCUMENTS

2013/0145966 A1* 6/2013 Schildbach ........... C07F 7/0836
106/611

FOREIGN PATENT DOCUMENTS

| | | |
|---|---|---|
| DE | 10 2005 045 228 | 4/2007 |
| EP | 0 140 186 | 5/1985 |
| EP | 2 518 095 | 10/2012 |
| GB | 1 481 182 | 7/1977 |
| WO | 1992/011328 | 7/1992 |
| WO | 1993/015849 | 8/1993 |
| WO | 2008/074491 | 6/2008 |
| WO | 2008/131715 | 11/2008 |

OTHER PUBLICATIONS

European Search Report mailed in EP 15 18 7571 and dated Feb. 4, 2016.
International Search Report mailed in PCT/EP2016/073218 dated Dec. 1, 2016, with English translation.
Written Opinion of the International Searching Authority mailed in PCT/EP2016/073218 dated Dec. 1, 2016.

* cited by examiner

ISOCYANATOALKYL ALKOXYSILANE ADDUCTS MODIFIED BY SILICONE RESINS AND THE USE THEREOF

This application is a National Stage entry under § 371 of International Application No. PCT/EP2016/073218, filed on Sep. 29, 2016, and which claims the benefit of European Patent Application No. 15187571.3, filed on Sep. 30, 2015.

The present invention relates to binders based on reaction products of alkoxysilane-containing silicone resins (silicone intermediates) and isocyanatoalkylalkoxysilane adducts, to processes for preparation thereof and to the use thereof, especially for use in formulations for paint, adhesive and sealant applications.

Polyurethanes have been established for many decades as high-value components for paint, adhesive, sealant and plastics systems. It is possible here for additional alkoxysilane groups to play an important role, for example with regard to network density, chemical resistance and scratch resistance, primarily through the formation of siloxane and polysiloxane structures. Molecules both possessing alkoxysilane groups and having isocyanate groups offer the option of introducing the functionalities that are the resulting reaction products, slioxanes and polyurethane groups, by means of one component. Such substances too have long been in use, for example in the form of isocyanatoalkyltrdalkoxysilanes. The systems mentioned are generally compatible with a multitude of organic polymers which are typically used in paint, adhesive and sealant applications. However, they in many cases exhibit nonoptimal performance in terms of weathering stability, for example after weathering over several years, for example in Florida, USA. Organic paint systems, for example polyurethane coatings, often exhibit a distinct loss of gloss after just a few months under these weathering conditions.

Likewise used as binders for a long time in the field of paint, adhesive and sealant applications have been silicone resins which, because of the presence of reactive alkoxysilyl groups, can be made to cure by means of a hydrolysis and condensation mechanism. This is generally accomplished with catalysts which promote the hydrolysis and/or condensation process of the curable groups. The preparation of silicone resins of this kind has long been known from the literature and is also described in German patent specification DE 34 12 648. What is advantageous about silicone resins is their high weathering stability. Thus, silicon-containing coatings lose little gloss even after weathering for several years.

However, a disadvantage of the silicone resins mentioned above is poor compatibility with other organic polymers that are typically used in paint, adhesive and sealant applications. Thus, methylsilicone resins are incompatible with virtually all organic binder systems. The poor compatibility of the components mentioned is based on the significant hydrophobicity of the silicone resins and is manifested, for example, in the fact that cloudy solutions are obtained on mixing.

There is therefore a need for novel binders that overcome the disadvantages of the prior art.

The problem addressed by this invention was that of making available novel binders that are compatible with other organic formulation constituents and are suitable for use in paint, adhesive or sealant applications for indoor and outdoor applications.

This problem is solved by binders according to the present invention. The present invention firstly provides binders based on a reaction product formed from an adduct (A) of an isocyanatoalkylalkoxysilane (A1) and an alcohol (A2) with an alkoxysilane-containing, Q unit-free alkyl- and/or arylsilicone resin (B) (silicone intermediate).

It has been found that, surprisingly, the reaction product of the invention has good compatibility with organic binders and is suitable for use as a paint, adhesive or sealant binder or binder component. Furthermore, the binders of the invention lead to coatings having improved weathering stability, which was not to be expected by the person skilled in the art.

An essential feature in the context of the present invention is the reaction product formed from an adduct (A) based on an isocyanatoalkylalkoxysilane (A1) and an alcohol (A2) with an alkoxysilane-containing Q unit-free alkyl- and or arylsilicone resin (B) (silicone intermediate), meaning that the adduct (A) and the silicone resin (B) (silicone intermediate) are present chemically bonded to one another in the binder of the invention.

The adducts (A) used in accordance with the invention are obtained according to the prior art by reacting an isocyanatoalkylalkoxysilane (A1) with alcohols (A2).

Preferably, the isocyanatoalkylalkoxysilane (A1) is selected from the group comprising isocyanatomethyltrimethoxysilane, isocyanatomethyltriethoxysilane, isocyanatomethyltriisopropoxysilane, 2-isocyanatoethyltrimethoxysilane, 2-isocyanatoethytriethoxysilane, 2-isocyanatoethyltriisopropoxysilane, 3-isocyanato-n-propyitrimethoxysilane, 3-isocyanato-n-propyttriethoxysilane, 3-isocyanato-n-propyitrisopropoxysilane, 4-isocyanato-n-butyitrimethoxysilane, 4-isocyanato-n-butytriethoxysilane and 4-isocyanato-n-butyitrisopropoxysilane. According to the invention, it is possible to use one or more isocyanatoalkoxysilanes (A1). Preference is given to using just one isocyanatoalkoxysilane. Very preferably, because this leads to particularly good results, the isocyanatoalkoxysilane (A1) is 3-isocyanato-n-propytrimethoxysilane.

According to the invention, it is additionally possible to use one or more alcohols (A2). Preference is given to using just one alcohol (A2). Alcohols (A2) used in the context of the present invention are preferably mono- and polyhydric alcohols.

Monohydric alcohols used may be linear or branched alcohols wherein the hydroxyl function is appended to a primary, secondary or tertiary carbon atom.

However, preference is given to using polyhydric alcohols. The term "polyhydric alcohol" as used herein is understood to mean an organic compound having at least two hydroxyl groups each preferably bonded covalently to one carbon atom each. Especially suitable are aliphatic branched diols or polyols. It is also possible to use mixtures of different polyhydric alcohols to prepare the adduct (A).

In a preferred embodiment, the polyhydric alcohol is selected from the group comprising ethylene glycol, propane-1,2-diol, propane-1,3-diol, butane-1,4-diol, pentane-1,5-diol, hexane-1,6-diol, decane-1,10-diol, dodecane-1,12-diol, glycerol, isosorbitol, isomannitol, isoiditol, 2,2,4-trimethylhexane-1,6-diol and 2,4,4-trimethylhexane-1,6-diol, alone or as any desired mixtures of these isomers, 2,2-dimethylbutane-1,3-diol, 2-methylpentane-2,4-diol, 3-methylpentane-2,4-diol, 2,2,4-trimethyl-1-pentane-1,3-diol, 2-ethylhexane-1,3-diol, 2,2-dimethylhexane-1,3-diol, 3-methylpentane-1,5-diol, 2-methylpentane-1,5-diol, 2,2-dimethylpropane-1,3-diol (neopentyl glycol), neopentyl glycol hydroxypivalate, polyethylene glycol, polypropylene glycol, sorbitol, pentaerythritol, 1,1,1-trimethylolpropane, 3(4),8(9)-bis(hydroxymethyl)tricyclo[5.2.1.0$^{2,6}$]decane (dicidol) and/or 2,2-bis(4-hydroxycyclohexyl)propane. Used with particular preference are 1,1,1-trimethylolpropane, 3 methylpentane-1,5-diol, neopentyl glycol, 2,2,4-trimethylhexane-1,6-diol and 2,4,4-trimethylhexane-1,6-diol, alone or as any desired mixtures of these isomers, and/or neopentyl glycol hydroxypivalate. The stated compounds may each be used alone or in the form of their mixtures. In a particularly preferred embodiment, which leads to particularly good results, 2,2,4-trimethylhexane-1,6-diol and/or 2,4,4-trimethylhexane-1,6-diol is/are used. The two isomers can thus be used alone or as a mixture in any desired ratio.

Further suitable polyhydric alcohols for preparation of the adducts (A) are oligomeric diols, for example polypropylene glycols, polybutylene glycols, and diethylene, dipropylene, triethylene and tetraethylene glycol. Suitable polyfunctional diols with n>2 are glycerol, hexanediol, hexane-1,2,6-triol, butane-1,2,4-triol, tris(β-hydroxyethyl)isocyanurate, mannitol or sorbitol. These components may likewise be used alone or as mixtures.

Further suitable polyhydric alcohols for preparation of the adduct (A) include, for example, hydroxyl-containing polymers such as polyesters, polyethers, polyacrylates, polycarbonates, polyolefins and polyurethanes. Preference is given to hydroxyl-containing polymers having an OH number of 20 to 500 mg KOH/gram and a mean molar mass of 250 to 6000 g/mol as additional polyhydric alcohols. Particularly preferred are hydroxyl-containing polyesters and/or polyacrylates having an OH number of 20 to 150 mg KOH/gram and an average molecular weight of 500 to 6000 g/mol. Hydroxyl number (OHN) is determined in accordance with DIN 53240-2. In addition, it is also possible to use mixtures of the abovementioned polymers or mixtures with monomeric or oligomeric diols or polyols as additional polyols.

The reaction of the polyhydric alcohol with the isocyanatoalkyltrialkoxysilanes to form the adducts (A) is further preferably effected in such a way that the molar ratio of OH groups in the alcohols (A2) to NCO groups in the isocyanatoalkyitrialkoxysilanes (A1) is preferably 0.8:1 to 1.2:1, more preferably 0.9:1 to 1.1:1. Stoichiometric reaction is especially preferred. In particular, therefore, with very particular preference, there is complete reaction of all OH groups of the diols with the NCO groups of the compounds of the isocyanatoalkytrialkoxysilanes.

In the stated reaction, the NCO groups of the isocyanatoalkylalkoxysilanes react with the OH groups of the diols to form —NH—CO—O— groups (urethane), which link these compounds to one another.

The adduct (A) is preferably an adduct of an isocyanatoalkylalkoxysilane and polyhydric alcohols, wherein more than 90, preferably more than 95 and more preferably more than 99 percent of the hydroxyl groups in the mono- or polyhydric alcohol have been converted by reaction with the isocyanatoalkylealkoxysilane and the residual NCO content is less than 0.1 wt %.

The skilled person, from the prior art and as part of his or her art knowledge, is aware of methods by which the number of reactive NCO groups may be determined.

The adducts (A) used in accordance with the invention are generally prepared solventlessly or using non-protic solvents, and the reaction may take place batchwise or continuously. Preferred solvents are ethyl acetate, butyl acetate, ethylene glycol monomethyl ether acetate, ethylene glycol monoethyl ether acetate, 1-methoxyprop-2-yl acetate, 3-methoxy-n-butyl acetate, acetone, 2-butanone, 4-methyl-2-pentanone, cyclohexanone, toluene, xylene, chlorobenzene, white spirit, more highly substituted aromatics (as in commerce, for example, under the designations solvent naphtha, Solvesso®, Isopar® and Nappar® from Deutsche EXXON CHEMICAL GmbH or as Shellsol® from Deutsche Shell Chemle GmbH), carbonic esters (especially dimethyl carbonate, diethyl carbonate, 1,2-ethylene carbonate and 1,2-propylene carbonate), lactones (especially propiolactone, butyrolactone, caprolactone and methylcaprolactone), propylene glycol diacetate, diethylene glycol dimethyl ether, dipropylene glycol dimethyl ether, diethylene glycol ethyl ether acetate, diethylene glycol butyl ether acetate, N-methylpyrrolidone and N-methylcaprolactam. The aforementioned solvents can be used alone or in any desired mixtures. Particular preference is given to using butyl acetate. The reaction is preferably carried out in the absence of water.

The reaction may be operated at room temperature, in other words at temperatures in the range from 20 to 25° C., though preferably higher temperatures are used, in the range from 30 to 150° C., more particularly in the range from 40 to 100° C. To accelerate the reaction it is advantageously possible to use catalysts which are known within urethane chemistry, for example Sn compounds, Bi compounds, Zn compounds and other organometallic compounds, but also tertiary amines, for example 1,4-diazabicyclo[2.2.2]octane (DABCO), triethylamine, etc.

The adduct (A) generated s subsequently reacted with an alkoxysilane-containing alkyl- and/or arylsilicone resin having no Q units (B) to give the reaction product according to the invention. Silicone resins, which can also be referred to as silicones, may have mono-, di-, tri- and/or tetrafunctional siloxane units. Corresponding units are also given the abbreviations M, D, T and Q. The silicone resin for use in accordance with the invention has no Q units, meaning that it does not possess any tetrafunctional siloxane units and hence any siloxane units having four oxygen atoms bonded to the silicon atom which contribute to the formation of the siloxane or are part of alkoxy groups. The silicone resins thus possess only M, D and/or T units. Accordingly, the silicone resin is only mono-, di- and/or trifunctional. Corresponding siloxane resins lead not only to particularly good compatibility in binders, but also to coatings which have low brittleness and are flexible and have good weathering stability.

The siloxane resin is an alkyl- and/or arylsilicone resin, meaning that it has alkyl and/or aryl groups bonded directly to silicon atoms. Since the silicone resin possesses only M, D and/or T units, each silicon atom is substituted by at least one alkyl and/or aryl radical. In addition, the silicone resin also possesses alkoxysilane groups, meaning that it may have one or more alkoxy groups bonded to silicon atoms.

The silicone resin (B) used in accordance with the invention is preferably a silicone resin (B) (silicone intermediate) containing units of the following formula (I)

$$R^3_c(R^4O)_d R^5_e SiO_{(4-c-d-e)/2} \qquad \text{formula (I)}$$

where $R^3$ may be the same or different and is a hydrogen atom, a monovalent, SIC-bonded, optionally substituted aliphatic hydrocarbyl radical or a divalent, optionally substituted, aliphatic hydrocarbyl radical that forms a bridge between two units of the formula (I), $R^4$ may be the same or different and is a hydrogen atom or a monovalent, optionally substituted hydrocarbyl radical, $R^5$ may be the same or different and is a monovalent, SiC-bonded, optionally substituted aromatic hydrocarbyl radical, c is 0, 1, 2 or 3, d is 0, 1, 2 or 3, preferably 0, 1 or 2, more preferably 0 or 1, and e is 0, 1 or 2, preferably 0 or 1, with the proviso that the sum total of c+d+e is greater than 0 and less than or equal to 3 and, in addition, c+e≥1, and preferably in at least 40 of the units of the formula (I) the sum total of c+e is 1.

Preference is given to using, as components (B), silicone resins in which at least 90% of all $R^3$ radicals are methyl radicals, at least 90% of all $R^4$ radicals are methyl, ethyl, propyl or isopropyl radicals and at least 90% of all $R^5$ radicals are phenyl radicals.

Preference is given in accordance with the invention to using silicone resins (B) having at least 20% and more preferably at least 40% of units of the formula (I) in which c is 0, based in each case on the total number of units of the formula (I).

In one version of the invention, silicone resins (B) having, based in each case on the total number of units of the formula (I), not more than 20%, more preferably not more than 10%, of units of the formula (I) in which c has the value of 2 are used.

Preferably, silicone resins (B) having, based in each case on the total number of units of the formula (I), at least 80%, more preferably at least 95%, of units of the formula (I) in which d has the value of 0 or 1 are used.

Preferably, silicone resins (B) having, based in each case on the total number of units of the formula (I), at least 5%, more preferably at least 10%, and at most 40%, more preferably at most 30%, of units of the formula (I) in which d has the value of 0 are used.

Preferably, components (B) used are silicone resins having, based in each case on the total number of units of the formula (I), at least 1%, preferably at least 10% and especially at least 20% of units of the formula (I) in which e has a value other than 0.

Preferably, silicone resins (B) having, based in each case on the total number of units of the formula (I), at least 20%, more preferably at least 40%, of units of the formula (I) in which e has the value of 1 are used.

Preferably, silicone resins (B) having, based in each case on the total number of units of the formula (I), at least 50% of units of the formula (I) in which the sum total of c+e is 1 are used.

In a particularly preferred execution of the invention, components (B) used are silicone resins having, based in each case on the total number of units of the formula (I), at least 20%, more preferably at least 40%, of units of the formula (I) in which e has the value of 1 and c has the value of 0. Preferably at most 70% and more preferably at most 40% of all units of the formula (I) have a d not equal to 0.

In a further particularly preferred execution of the invention, components (B) used are silicone resins having, based in each case on the total number of units of the formula (I), at least 20%, more preferably at least 40%, of units of the formula (I) in which e has the value of 1 and c has the value of 0, and additionally having at least 1%, preferably at least 10%, of units of the formula (I) in which c is 1 or 2, and e is 0.

Examples of silicone resins (B) used in accordance with the invention are organopolysiloxane intermediates/silicone resins consisting essentially and preferably exclusively of (T) units of the formulae $PhSiO_{3/2}$, $PhSi(OR^4)O_{2/2}$ and $PhSi(OR^4)_2O_{1/2}$, (D) units of the formulae $Me_2SiO_2$ and $Me_2Si(OR^4)_2O_{1/2}$ and (M) units of the formula $Me_3SiO_{1/2}$, where Me is a methyl radical, Ph is a phenyl radical and $R^4$ is a hydrogen atom or alkyl radicals optionally substituted by halogen atoms and having 1 to 10 carbon atoms, more preferably a hydrogen atom or alkyl radicals having 1 to 4 carbon atoms, where the resin contains, per mole of (T) units, preferably 0-2 mol of (D) units and 0-2 mol of (M) units.

Preferred examples of the silicone resins (B) used in accordance with the invention are organopolysiloxane intermediates/silicone resins consisting essentially, preferably exclusively, of T units of the formulae $PhSiO_3$, $PhSi(OR^4)O_{2/2}$ and $PhSi(OR_4)_2O_{1/2}$ and D units of the formulae $Me_2SiO_{2/2}$ and $Me_2Si(OR^4)O_{1/2}$, where Me is a methyl radical, Ph is a phenyl radical and $R^4$ is a hydrogen atom or alkyl radicals optionally substituted by halogen atoms and having 1 to 10 carbon atoms, more preferably a hydrogen atom or alkyl radicals having 1 to 4 carbon atoms, with a molar ratio of (T) to (D) units of 0.5 to 2.0.

Further preferred examples of the silicone resins (B) used in accordance with the invention are organopolysiloxane intermediates/silicone resins consisting essentially, preferably exclusively, of T units of the formulae $PhSiO_{3/2}$, $PhSi(OR^4)O_{2/2}$ and $PhSi(OR^4)_2O_{1/2}$ and T units of the formulae $MeSiO_{3/2}$, $MeSi(OR^4)O_{2/2}$ and $MeSi(OR^4)_2O_{1/2}$ and optionally D units of the formulae $Me_2SiO_{2/2}$ and $Me_2Si(OR^4)O_{1/2}$, where Me is a methyl radical, Ph is a phenyl radical and $R^4$ is a hydrogen atom or alkyl radicals optionally substituted by halogen atoms and having 1 to 10 carbon atoms, more preferably a hydrogen atom or alkyl radicals having 1 to 4 carbon atoms, with a molar ratio of phenylsilicone to methylslicone units of 0.5 to 4.0. The content of D units in these silicone resins is preferably below 10 wt %.

Additional preferred examples of silicone resins (B) used in accordance with the invention are organopolysiloxane intermediates/silicone resins consisting essentially, preferably exclusively, of T units of the formulae $PhSiO_{3/2}$, $PhSi(OR^4)O_{2/2}$ and $PhSi(OR^4)_2O_{1/2}$, where Ph is a phenyl radical and $R^4$ is a hydrogen atom or alkyl radicals optionally substituted by halogen atoms and having 1 to 10 carbon atoms, more preferably a hydrogen atom or alkyl radicals having 1 to 4 carbon atoms. The content of D units in these silicone resins is preferably below 10 wt %.

Likewise preferably, the silicone resins satisfy the general formula (II)

$$R_aSi(OR')_bO_{(4-a-b)/2} \qquad \text{formula (II)}$$

where

R is independently selected from the group of the alkyl radicals having 1-8 carbon atoms and the aryl or aralkyl radicals having 6-20 carbon atoms, R' is independently selected from the group of the alkyl radicals having 1-8 carbon atoms, $1 \leq a < 2$ and $a+b<4$.

Preferably, the silicone resins (B) used in accordance with the invention have a mean molar mass (number-average) Mn of at least 400 g/mol and more preferably of at least 600 g/mol. The mean molar mass Mn is preferably not more than 400 000 g/mol, more preferably not more than 100 000 g/mol, especially not more than 50 000 g/mol.

The silicone resins (B) used in accordance with the invention may be either liquid or solid at 23° C. and 1000 hPa, the silicone resins (B) used with preference being liquid. Preferably, the silicone resins (B) have a viscosity of 10 to 100 000 mPas, preferably of 50 to 50 000 mPas, especially 100 to 20 000 mPas. The silicone resins (B) preferably have a polydispersity (Mw/Mn) of not more than 5, preferably of not more than 3.

The silicone resins (B) may be used either in pure form or in the form of a solution in a suitable solvent.

Solvents used may be substances such as ethers (e.g. diethyl ether, methyl t-butyl ether, ether derivatives of glycol, THF), esters (e.g. ethyl acetate, butyl acetate, glycol esters), hydrocarbons (e.g. pentane, cyclopentane, hexane, cyclohexane, heptane, octane or else longer-chain branched and unbranched alkanes), ketones (e.g. acetone, methyl ethyl ketone), aromatics (e.g. toluene, xylene, ethylbenzene, chlorobenzene) or else alcohols (e.g. methanol, ethanol, glycol, propanol, isopropanol, glycerol, butanol, isobutanol, t-butanol).

However, preference is given to using silicone resins (B) that are free of organic solvents.

The silicone resins (B) used in accordance with the invention are commercial products or can be prepared by methods that are standard in silicon chemistry.

Preferably, the alkoxysilane-containing silicone resin/silicone intermediate (B) is SILRES® SY 231 (methoxy-functional methyl-/phenylsilicone resin from Wacker). SILRES® IC 232 (methoxy-functional methyl-/phenylsilicone intermediate from Wacker), SILRES® IC 678 (methoxy-functional phenylsilicone intermediate from Wacker), SILRES® IC 368 at Wacker Chemle AG, DOW CORNING® 3074 (methoxy-functional methyl-/phenylsilcone intermediate from Dow Corning) or DOW CORNING® US-CF 2403 Resin (methoxy-functional methylsilicone intermediate from Dow Corning), DOW CORNING® RSN-5314 Resin (methoxy-functional methyl/phenylsilicone intermediate from Dow Corning).

In a particularly preferred embodiment of the present invention, component (B) is a solvent-free liquid phenyl-silicone intermediate consisting of phenyl-functional T units (60-65 wt %) and methyl-functional T units (18-22 wt %) and dimethyl-functional D units (2-4 wt %), and has a content of methoxy groups of 12-16 wt % and a mean molar mass of 800-1300 daltons (commercially available under the SILRES® IC 368 name from Wacker Chemie AG).

The present invention likewise provides processes for preparing the binders of the invention, comprising the reaction of an adduct (A) formed from an isocyanatoalkylalkoxysilane (A1) and an alcohol (A2) with an alkoxysilane-containing alkyl- and/or arylsilicone resin (silicone intermediate) (B), optionally in the presence of a catalyst (C), an alcohol (D) and/or water.

The inventive reaction of adduct (A) with alkoxysilane-containing alkyl- and/or arylsilicone resin (silicone intermediate) (B) can be effected batchwise or continuously. The reaction can be conducted at temperatures in the range of 30-150° C., especially in the range of 50-150° C.

To accelerate the reaction, it is optionally possible to use catalysts (C) that are standard in silane chemistry. In a preferred embodiment of the present invention, catalysts (C) used are those selected from the group comprising organic carboxylic acids having a melting point of >60° C. tetraalkylammonium carboxylates, metal complexes with chelate ligands, organic Sn(IV), Sn(II), Zn and Bi compounds, tertiary amines, phosphorus-containing, preferably phosphorus- and nitrogen-containing catalysts, organic sulphonic acids in an unblocked or blocked form, or mixtures of these.

Catalysts (C) used may, for example, be organic carboxylic acids having a melting point >60° C. Examples of suitable carboxylic acids are, in particular, salicylic acid, benzoic acid, citric acid, phthalic acid, terephthalic acid, isophthalic acid, dodecanoic acid, 1,12-dodecanedioic acid and/or ascorbic acid. Preference is given to using salicylic acid, citric acid or benzoic acid, and mixtures of the stated carboxylic acids may also be employed.

Catalyst (C) used may alternatively also be a tetraalkylammonium carboxylate. Examples thereof are tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and/or tetrabutylammonium benzoate. The cited tetraalkylammonium carboxylates may be added alone or in mixtures.

As catalyst (C) it is additionally also possible to use metal complexes with chelate ligands. The chelate ligands are organic compounds having at least two functional groups which are able to coordinate to metal atoms or metal ions. Use may be made, for example, of the aluminium- and zirconium-chelate complexes, as described in U.S. Pat. No. 4,772,672, as catalyst. Preferred metal chelates are chelates based on aluminium, zirconium, titanium and/or boron, such as aluminium ethyl acetoacetate and/or zirconium ethyl acetoacetate.

Catalysts (C) used for catalysis may also be organic Sn(IV), Sn(II), Zn or Bi compounds or tertiary amines.

As catalyst (C) it is additionally also possible to use a phosphorus-containing catalyst, preferably a phosphorus- and nitrogen-containing catalyst. Mixtures of two or more different catalysts may also be used here. Examples of suitable phosphorus-containing catalysts are substituted phosphonic diesters and diphosphonic diesters, preferably from the group consisting of acyclic phosphonic diesters, cyclic phosphonic diesters, acyclic diphosphonic diesters and cyclic diphosphonic diesters. Catalysts of these kinds are described in DE-A 102005045228, for example.

As catalyst (C) it is also possible with preference to use an amine-blocked phosphoric ester and with particular preference amine-blocked ethylhexyl phosphate or amine-blocked phenyl phosphate. Examples of amines with which the phosphoric esters are blocked are especially tertiary amines, for example triethylamine. Particularly preferred for use for blocking the phosphoric esters are tertiary amines which exhibit high catalyst activity at curing temperatures of 100 to 160° C. Certain amine-blocked phosphoric acid catalysts are also available commercially (e.g. Nacure products from King Industries). One example of a particularly suitable catalyst is the amine-blocked phosphoric partial ester under the Nacure 4167 name from King Industries.

Also possible for use as catalyst (C) are organic sulphonic acids in non-blocked or blocked form. A suitable sulphonic acid is in principle any organic sulphonic acid, preference being given to p-toluenesulphonic acid and dodecylbenzenesulphonic acid. For coating systems which crosslink thermally, i.e. above 100° C., these sulphonic acids, in accordance with the invention, may also be employed preferably in amine-neutralized form. Also possible for use in accordance with the Invention are latent, non-ionogenic sulphonic acid derivatives which release sulphonic acids only at above 100° C., such as adducts of sulphonic acids with epoxide-containing components, for example, as described in DE A 23 56768.

Salts of trifluoromethanesulphonic acid (triflates) as well are suitable sulphonic acid-based catalysts.

The catalyst (C) in the coating compositions of the Invention may consist solely of the abovementioned alternatives, although any desired mixtures of the catalysts may also be used.

When catalysts are employed they are preferably employed in a concentration in the range from 0.001 to 5 wt %, by preference in the range from 0.2 to 3 wt %, based on the total weight of the reactants.

Optionally, the reaction can be effected in the presence of an alcohol (D), the description of alcohol (D) corresponding to the abovementioned description of the alcohol (A2).

If alcohols (D) are used, they are preferably used in a concentration in the range from 0.1 to 10 wt %, by preference in the range from 0.5 to 5 wt %, based on the total weight of the co-reactants.

Optionally, the reaction can be effected in the presence of water. If water is used, it is preferably used in a concentration in the range from 0.001 up to 5 percent by weight, based on the total weight of the co-reactants.

Preferably, the adduct (A) prepared from an isocyanatoalkylalkoxysilane (A1) and an alcohol (A2) is used in a concentration in the range from 1 to 98 wt %, preferably in the range from 10 to 80 wt %, most preferably in the range of 40-60 wt %, based on the total weight of the co-reactants.

Preferably, the alkoxysilane-containing alkyl- and/or arylsilicone resin (silicone intermediate) (B) is used in a concentration in the range from 1% to 98 wt %, preferably in the range from 10 to 80 wt %, most preferably in the range of 40-60 wt %, based on the total weight of the co-reactants.

In a very particularly preferred embodiment, adduct (A) and alkoxysilane-containing alkyl- and/or arylsilicone resin (silicone intermediate) (B) are used in an equal weight ratio, for example 45 wt % of adduct (A) and 45 wt % of silicone resin (silicone intermediate) (B).

The invention also provides for the use of the binders of the invention in the field of paint, adhesive and sealant applications.

Preferably, the reaction product is used as crosslinking component in paint, adhesive and sealant applications.

It is more preferably used for scratch-resistant and flexible clearcoats. For optimization of the paint properties, it is used either alone or in blended form in combination with further polymeric binders which may also bear crosslinkable functional groups.

The present invention further provides coating compositions which are curable preferably at temperatures of 20 to 150° C., comprising
I) at least one binder of the invention,
II) optionally one or more additional binder components,
III) optionally a catalyst,
IV) optionally auxiliaries and additives,
V) optionally organic solvents and
VI) optionally aminosilanes.

The paints for employment in the use of the invention may be solvent-free or solvent-containing. With more particular preference, the coating compositions to be employed are non-aqueous. Non-aqueous in the sense of the present invention means a water content in the coating composition of not more than 1.0 wt %, preferably not more than 0.5 wt %, based on the coating composition.

The fraction of the binder of the invention as component I) in the coating composition of the invention is preferably 30-99 wt %, more preferably 20 to 80 wt %, based on the coating composition.

The coating composition of the invention may further optionally comprise one or more additional binder components II). Suitable in principle as binder components are all kinds of binders known to the skilled person, including, for example, binders which are thermoplastic, in other words not crosslinkable, which customarily have an average molecular weight >10 000 g/mol. However, preference is given to using binders comprising reactive functional groups having acidic hydrogen atoms. Suitable binders of the cited type have for example at least one, but preferably two or more, hydroxyl group(s). Further suitable functional groups of the binder are trialkoxysilane functionalities, for example.

As binders with functional groups, preference is given to using hydroxyl-containing polymers, more particularly hydroxyl-containing polyesters, polyethers, poly(meth)acrylates, polycarbonates and polyurethanes having an OH number of 20 to 500 mg KOH/g and an average molar mass of 250 to 6000 g/mol. In the context of the present invention particular preference is given to using hydroxyl group-containing polyesters or poly(meth)acrylates having an OH number of 20 to 150 mg KOH/g and an average molecular weight of 500 to 6000 g/mol as binder components. The term poly(meth)acrylates is to be understood as meaning both polyacrylates and polymethacrylates. Hydroxyl number (OHN) is determined in accordance with DIN 53240-2. This method comprises reacting the sample with acetic anhydride in the presence of 4-dimethylaminopyridine as catalyst to acetylate the hydroxyl groups. This affords one molecule of acetic acid per hydroxyl group while the subsequent hydrolysis of the excess acetic anhydride yields two molecules of acetic acid. The consumption of acetic acid is determined by titrimetry from the difference between the main value and a blank value to be carried out in parallel. The molecular weight is determined by means of gel permeation chromatography (GPC). The samples were characterized in tetrahydrofuran eluent in accordance with DIN 55672-1.

Hydroxyl-containing (meth)acrylic copolymers used may be resins having a monomer composition of the kind described, for example, in WO 93/15849 (page 8, line 25 to page 10, line 5), or else in DE 195 29124. The acid number of the (meth)acrylic copolymer to be established by employing a proportion of (meth)acrylic acid as monomer should be 0-30, preferably 3-15 mg KOH/g. The number-average molar weight (determined by gel permeation chromatography against a polystyrene standard) of the (meth)acrylic copolymer is preferably 2000-20 000 g/mol and the glass transition temperature is preferably −40° C. to +60° C. The hydroxyl content of the (meth)acrylic copolymers for employment in accordance with the invention, which is to be established by employing a proportion of hydroxyalkyl (meth)acrylates, is preferably 70-250 mg KOH/g and particularly preferably 90-190 mg KOH/g.

Polyester polyols suitable in accordance with the invention are resins having a monomer composition composed of dicarboxylic and polycarboxylic acids and of diols and polyols, as described, for example, in WO 93/15849. Also employable as polyester polyols are polyaddition products of caprolactone onto low molecular weight di- and trios as are available under the trade name CAPA (Perstorp) for example. The arithmetically determined number-average molar weight is preferably 500-5000 g/mol, more preferably 800-3000 g/mol and the average functionality is preferably 2.0-4.0, more preferably 2.0-3.5.

As urethane- and ester-group-containing polyols for use in accordance with the invention, those employed include in principle those of the kind as described in EP 140 186. Preference is given to using polyols which comprise urethane and ester groups and are prepared using HDI, IPDI, trimethylhexamethylene diisocyanate (TMDI) or $H_{12}$MDI. The number-average molar weight is preferably 500-2000 g/mol and the average functionality is in particular in the range from 2.0-3.5.

Trialkoxysilane-functional binders as well are suitable for use as component II). Such resins may be obtained by copolymerization of acrylate or methacrylate monomers with acryloyl- or methacryloyl-functional alkyl trialkoxysilane derivatives (for example Dynasylan® MEMO from Evonik Resource Efficiency GmbH) as are described, for example, in WO 92/11328. An alternative synthesis pathway is that of the derivatization of hydroxyl-containing polyethers, polyesters, polycarbonate-diols or polyacrylates with isocyanatopropyltrialkoxysilane, as is described in Examples 3 and 4 of WO 2008/131715, for example.

It will be appreciated that it is also possible to employ mixtures of the binders described hereinabove. Preferred binders are hydroxyl group-containing polyesters and polyacrylates, alone or in mixtures.

The fraction of II) in the coating composition of the invention, if present, is preferably 10-80 wt %, based on the coating composition, more particularly 20 to 80 wt %.

The mass ratio of component I) to component II) in the coating composition of the invention is preferably 3:7 to 7:3.

For a curing rate at ambient temperature, however, the reactivity of the reaction product of the Invention may not be sufficient. In order to increase the crosslinking rate, therefore, it is possible with preference to add catalysts and/or to carry out the curing at temperatures above ambient temperature.

In order to obtain a sufficient curing rate at curing temperatures of less than 100° C. catalysts III) are preferably employed. Suitable catalysts are, in particular, Lewis acids, chelates, salts or particles of transition or other metals, based for example on titanium, aluminium, tin or zirconium complexes, sulphonic acids in free or else neutralized or adducted form, as are described in DE 2356768, for example, phosphoric acid or phosphorous acids and their derivatives (WO 2008/074491, page 18, lines 1-17), high-boiling acids, quaternary ammonium carboxylates, or else combinations of the stated compounds.

Preference is given to using chelates or salts of transition metals, or high-boiling acids, quaternary ammonium carboxylates, or combinations of the cited compounds.

With particular preference component III) is at least one catalyst selected from the group IIIa) of the organic carboxylic acids having a melting point above 60° C. and/or from group IIIb) of the tetraalkylammonium carboxylates.

Suitable organic carboxylic acids having a melting point above 60° C. (at atmospheric pressure) are compounds which are not volatile at room temperature. Examples of carboxylic acids to be used for advantage include salicylic acid, benzoic acid, citric acid, isophthalic acid, phthalic acid, terephthalic acid and/or trimellitic acid. In the context of the present invention preference is given to using salicylic acid and benzoic acid.

Employed as catalyst IIIb) is a tetraalkylammonium carboxylate. Examples thereof are tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and/or tetrabutylammonium benzoate. The cited tetraalkylammonium carboxylates may be added alone or in mixtures. Preference is given to using tetraethylammonium benzoate and/or tetrabutylammonium benzoate.

The catalyst component III) in the coating compositions of the invention may consist solely of the abovementioned alternatives IIIa) or IIIb), although any desired mixtures of the catalysts IIIa) and IIIb) may also be used. Such mixtures of IIIa) and IIIb) have, in particular, a mass ratio of 9:1 to 1:9. The fraction of component III) is preferably up to 4 wt %, based on the coating composition, preferably 0.1 to 4 wt %.

Very particular preference is given to using, as catalyst component III), the same compound as used as catalyst C) for the preparation of the binder of the invention.

The coating composition of the invention may further comprise auxiliaries and/or additives IV) that are known within coatings technology, such as stabilizers, including light stabilizers, catalysts, fillers, pigments, flow control agents or rheological assistants, such as "sag control agents", for example, microgels or pyrogenic silicon dioxide, in typical concentrations. If necessary, inorganic or organic colour and/or effect pigments customary in coatings technology may also be Incorporated in component IV) of the coating compositions of the invention.

In the case of pigment-free coating compositions, i.e. clearcoat materials, component IV) is present preferably in amounts from 0.5 up to 8 wt %, more particularly 1 to 6 wt %, based on the coating composition, in the coating composition of the invention. In the case of pigment- and/or filler-containing coating compositions, the content of component IV) may be 5 to 80 wt %, more particularly 10 to 70 wt %, based on the coating composition.

The coating composition of the invention may further comprise organic solvents as component V). Suitable solvents are, for example, ketones, esters, alcohols or aromatics.

Component V) is present in the coating composition of the Invention preferably in amounts from 20 up to 60 wt %, more particularly 20% to 50%, based on the coating composition. The amount of component V) is guided by the target application viscosity for the coating composition.

Component VI) of the coating compositions of the invention is at least one aminosilane. In particular the at least one aminosilane is one of the general formula $A_mSiY_n$, in which A is a substituted or unsubstituted aminoalkyl group, a substituted or unsubstituted diaminodialkyl group or a substituted or unsubstituted triaminotrialkyl group, the groups Y are identical or different, with Y standing for OH, ONa, OK, OR', OCOR', OSIR'$_3$, Cl, Br, I or NR'$_2$, m is 1 or 2 and n is 1, 2 or 3, with the condition that m+n=4, and the groups R' independently are hydrogen or linear or branched alkyl, cycloalkyl, alkenyl, cycloalkenyl, alkynyl, cycloalkynyl, aryl or heteroaryl groups, have in each case 1 to 18 C atoms, and may in each case optionally be substituted. It is preferable when m is 1 and n is 3. It is further preferable when Y is selected from OH or OR', particular preference being given to OR'. In this case R' is in particular selected from methyl or ethyl groups, particular preference being given to methyl groups. It is also possible to use dimeric or polycondensed oligomers of these aminosilanes.

Preferred aminosilanes are those selected from the group consisting of 3-aminopropyltrimethoxysilane, 3-aminopropyltriethoxysilane, 2-aminoethyl-3-aminopropyltrimethoxysilane, 3-aminopropyl(diethoxymethoxysilane), 3-aminopropyl(tripropoxysilane), 3-aminopropyl(dipropoxymethoxysilane), 3-aminopropyl(tridodecanoxysilane), 3-aminopropyl(tritetradecanoxysilane), 3-aminopropyl(trihexadecanoxysilane), 3-aminopropyl(trioctadecanoxysilane), 3-aminopropyl(didodecanoxy)tetradecanoxysilane, 3-aminopropyl(dodecanoxy)tetradecanoxy(hexadecanoxy)silane, 3-aminopropyl(dimethoxymethylsilane), 3-aminopropyl(methoxydimethylsilane), 3-aminopropyl(hydroxydimethylsilane), 3-aminopropyl(diethoxymethylsilane), 3-aminopropyl(ethoxydimethylsilane), 3-aminopropyl(dipropoxymethylsilane), 3-aminopropyl(propoxydimethylsilane), 3-aminopropyl(diisopropoxymethylsilane), 3-aminopropyl(isopropoxydimethylsilane), 3-aminopropyl(dibutoxymethylsilane), 3-aminopropyl(butoxydimethylsilane), 3-aminopropyl(diisobutoxymethylsilane), 3-aminopropyl(isobutoxydimethylsilane), 3-aminopropyl(didodecanoxymethylsilane), 3-aminopropyl(dodecanoxydimethylsilane), 3-aminopropyl(ditetradecanoxymethylsilane), 3-aminopropyl(tetradecanoxydimethylsilane), 2-aminoethyl(trimethoxysilane), 2-aminoethyl(triethoxysilane), 2-aminoethyl(diethoxymethoxysilane), 2-aminoethyl(tripropoxysilane), 2-aminoethyl(dipropoxymethoxysilane), 2-aminoethyl(tridodecanoxysilane), 2-aminoethyl(tritetradecanoxysilane), 2-aminoethyl(trihexadecanoxysilane), 2-aminoethyl(trioctadecanoxysilane), 2-aminoethyl(didodecanoxy)tetradecanoxysilane, 2-aminoethyl(dodecanoxy)tetradecanoxy(hexadecanoxy)silane, 2-aminoethyl(dimethoxymethylsilane), 2-aminoethyl(methoxydimethylsilane), 2-aminoethyl(diethoxymethylsilane), 2-aminoethyl(ethoxydimethylsilane), 1-aminomethyl(trimethoxysilane), 1-aminomethyl(triethoxysilane), 1-aminomethyl(diethoxymethoxysilane), 1-aminomethyl(dipropoxymethoxysilane), 1-aminomethyl(tripropoxysilane), 1-aminomethyl(trimethoxysilane), 1-aminomethyl(dimethoxymethylsilane), 1-aminomethyl(methoxydimethylsilane), 1-aminomethyl(diethoxymethylsilane), 1-aminomethyl(ethoxydimethylsilane), 3-aminobutyl(trimethoxysilane), 3-aminobutyl(triethoxysilane), 3-aminobutyl(diethoxymethoxysilane), 3-aminobutyl(tripropoxysilane), 3-aminobutyl(dipropoxymethoxysilane), 3-aminobutyl(dimethoxymethylsilane), 3-aminobutyl(diethoxymethylsilane), 3-aminobutyl(dimethylmethoxysilane), 3-aminobutyl(dimethylethoxysilane), 3-aminobutyl(tridodecanoxysilane), 3-aminobutyl(tritetradecanoxysilane), 3-aminobutyl(trihexadecanoxysilane), 3-aminobutyl(didodecanoxy)tetradecanoxysilane, 3-aminobutyl(dodecanoxy)tetradecanoxy(hexadecanoxy)silane, 3-amino-2-methylpropyl(trimethoxysilane), 3-amino-2-methylpropyl(triethoxysilane), 3-amino-2-methylpropyl(diethoxymethoxysilane), 3-amino-2-methylpropyl(tripropoxysilane), 3-amino-2-methylpropyl(dipropoxymethoxysilane), 3-amino-2-methylpropyl(tridodecanoxysilane), 3-amino-2-methylpropyl(tritetradecanoxysilane), 3-amino-2-methylpropyl(trihexadecanoxysilane), 3-amino-2-methylpropyl(trioctadecanoxysilane), 3-amino-2-methylpropyl(didodecanoxy)tetradecanoxysilane, 3-amino-2-methylpropyl(dodecanoxy)tetradecanoxy(hexadecanoxy)silane, 3-amino-2-methylpropyl(dimethoxymethylsilane), 3-amino-2-methylpropyl(methoxydimethylsilane), 3-mercapto-2-methylpropyl(diethoxymethylsilane), 3-mercapto-2-methylpropyl(ethoxydimethylsilane), 3-mercapto-2-methylpropyl(dipropoxymethylsilane), 3-amino-2-methylpropyl(propoxydimethylsilane), 3-amino-2-methylpropyl(diisopropoxymethylsilane), 3-amino-2-methylpropyl(isopropoxydimethylsilane), 3-amino-2-methylpropyl(dibutoxymethylsilane), 3-amino-2-methylpropyl(butoxydimethylsilane), 3-amino-2-methylpropyldiisobutoxymethylsilane), 3-amino-2-methylpropyl(isobutoxydimethylsilane), 3-amino-2-methylpropyl(didodecanoxymethylsilane), 3-amino-2-methylpropyl(dodecanoxydimethylsilane), 3-amino-2-methylpropyl(ditetradecanoxymethylsilane) or 3-amino-2-methylpropyl(tetradecanoxydimethylsilane), triamino-functional propyltrimethoxysilane, bis(3-trimethoxysilylpropyl)amine, bis(3-triethoxysilylpropyl)amine, N-benzyl-N-(2-aminoethyl)-3-aminopropyltrimethoxysilane hydrochloride, N-benzyl-N-(2-aminoethyl)-3-aminopropyltrimethoxysilane hydroacetate, N-(n-butyl)-3-aminopropyltrimethoxysilane, 3-aminopropylmethyldiethoxysilane, N-vinylbenzyl-N-(2-aminoethyl)-3-aminopropylpolysiloxane and N-(2-aminoethyl)-3-aminopropylmethyldimethoxysilane.

Preferred aminosilanes or aminoalkylsilanes are substituted or unsubstituted aminosilane compounds, in particular 3-aminopropyltrimethoxysilane, 3-aminopropyltriethoxysilane, 3-aminopropylmethyldiethoxysilane, N-(2-aminoethyl)-3-aminopropyltrimethoxysilane, 2-aminopropyl-3-aminopropyltrimethoxysilane, 2-aminopropyl-3-aminopropyltriethoxysilane, 2-aminoethyl-2-aminoethyl-3-aminopropyltrimethoxysilane, 2-aminoethyl-2-aminoethyl-3-aminopropyltriethoxysilane and N-(n-butyl)-3-aminopropyltrimethoxysilane.

The aminosilane is more preferably selected from the group consisting of 3-aminopropyltrimethoxysilane (DYNASYLAN® AMMO), 3-aminopropyltriethoxysilane (DYNASYLAN® AMEO), 3-aminopropylmethyldiethoxysilane (DYNASYLAN® 1505), N-(n-butyl)-3-aminopropyltrimethoxysilane (DYNASYLAN® 1189) and N-(2-aminoethyl)-3-aminopropyltrimethoxysilane (DYNASYLAN® DAMO), $(H_3CO)_3Si(CH_2)_3NH(CH_2)_3Si(OCH_3)_3$ (bis-AMMO), $(H_5C_2O)_3Si(CH_2)_3NH(CH_2)_3Si(OC_2H_5)_3$ (bis-AMEO), $(H_3CO)_3Si(CH_2)_3NH(CH_2)_2NH(CH_2)_2NH(CH_2)_3Si(OCH_3)_3$ (bis-DAMO) (all from Evonik Resource Efficiency GmbH).

The amount of component VI) in the coating composition of the invention is preferably 5 to 30 wt %, especially preferably 10 to 20 wt %, based in each case on the coating composition.

The sum total of all fractions of components I) to VI) makes 100 wt %. The coating compositions of the invention preferably consist of the stated components I) to V).

The coating compositions of the Invention can especially be used for coating of wood, medium-density wood fibreboards, paper, plastic, composites, glass, textiles or metal.

Particularly clearcoat materials comprising the reaction product or coating composition of the invention likewise form part of the subject-matter of the present invention. The coating compositions of the invention are also suitable for multi-coat finishing, for example as clearcoat material in automotive OEM finishing.

The present invention likewise provides metal- or plastic-coating compositions, in particular for car bodies, cycles and motorcycles, building components and household appliances, comprising the reaction product of the Invention.

The coating compositions of the invention are produced by mixing of the components described above. The mixing and dispersing of the components may be accomplished in mixers known to the skilled person, examples being stirring vessels, dissolvers, bead mills, roll mills, etc., or else continuously by means of static mixers.

Even without further exposition it is believed that a person skilled in the art will be able to make the widest use of the above description. The preferred embodiments and examples are therefore to be understood merely as a descriptive disclosure which is not in any way intended to be limiting. The present Invention will now be more particularly described with reference to examples. Alternative embodiments of the present Invention are obtainable analogously.

EXAMPLES

Unless stated otherwise, the percentages stated in the examples are based on weight.

Products Used:

SILRES® IC 368: Methoxy-functionalized methyl/phenyl polysiloxane intermediate, Wacker Chemie AG Setalux 1767 W-65: Polyacrylate polyol, Nuplex Resins B.V.

Setalux 1760 VB-64: Polyacrylate polyol, Nuplex Resins B.V.

Vestanat® EP Cat 11 B: Tetraethylammonium benzoate in butanol, Evonik Resource Efficiency GmbH Vestanat® EP-M60, Vestanat® EP-M95, Vestanat® EP-M120: Isocyanatopropyltrimethoxysilane adducts with polyhydric alcohol. Evonik Resource Efficiency GmbH Two-component polyurethane basecoat: To produce the basecoat, the pigmentation was first prepared, by grinding an initial charge of 54.52% Setalux 1187, 45.35% Kronos 2310 and 0.14% Aerosil R972 by means of Scandex for 20 min. 75.36% of this pigmentation were then mixed by stirring with 0.56% of a 1% solution of dibutyltin dilaurate in butyl acetate, 5.00% Byk 358N (Byk Chemie GmbH) dissolved in a 10% solution in butyl acetate, 0.78% butyl acetate and 18.30% Vestanat® T1890L (isophorone diisocyanate, homopolymer, Evonik Resource Efficiency GmbH) to give the corresponding white paint batch. The white paint was then applied to aluminium sheet by means of a spin-coater (spin-coating conditions 30 s at 650-700 rpm) and then hardened at 80° C. for 30 min.

29-Si NMR:

The 29-Si NMR samples were analysed on a Bruker® 500 MHz instrument. The resonance frequency for the 29-Si nucleus is 39.7 MHz. All chemical shifts are reported with respect to tetramethylsilane "TMS" (δ=0 ppm). The spectra were quantitatively evaluated by integration of the signals using the analysis software. For better clarity, only the shifts for the M units of the formula $R_3SiO_{1/2}$ are reported here.

Example 1: Preparation of Inventive Binder 1 (M60+Silres, TEAB)

200 g of Vestanat EP-M60, 200 g of SILRES IC 368 and 2 g of tetraethylammonium benzoate (TEAB) were introduced into a flask and the latter was fitted with a reflux condenser. The mixture was then heated to 100° C. while stirring. After a reaction time of 6 h, the binder 1 obtained was cooled down. This resulted in a clear liquid having a viscosity (23° C.) of 469 mPas. $^{29}$Si NMR signals (ppm) In DMSO: −47 (3.6 mol % of SI from $Me_3SiO_{1/2}$), −49 (5.8 mol % of Si M structure from binder 1)

Example 2: Preparation of Inventive Binder 2 (M95+Silres, TEAB)

200 g of Vestanat EP-M95, 200 g of SILRES IC 368 and 2 g of tetraethylammonium benzoate were introduced into a flask and the latter was fitted with a reflux condenser. The mixture was then heated to 100° C. while stirring. After a reaction time of 6 h, the binder 2 obtained was cooled down. This resulted in a clear liquid having a viscosity (23° C.) of 475 mPas. $^{29}$Si NMR signals (ppm) in $CDCl_3$: −48 (3.5 mol % of Si from $Me_3SiO_{1/2}$), −50 (3.4 mol % of Si M structure from binder 2)

Example 3: Preparation of Inventive Binder 3 (M120+Silres, TEAB)

200 g of Vestanat EP-M120, 200 g of SILRES IC 368 and 2 g of tetraethylammonium benzoate were introduced into a flask and then heated to 100° C. while stirring. After a reaction time of 6 h, the binder 3 obtained was diluted with 30% xylene and cooled down. This resulted in a clear liquid having a viscosity (23° C.) of 19 mPas. $^{29}$Si NMR signals (ppm) in DMSO: −47 (3.8 mol % of Si from $Me_3SiO_{1/2}$), −49 (62 mol % of Si M structure from binder 3)

Study of Compatibility of the Reaction Products of the Invention with Organic Resins:

50 g of the respective inventive binder were admixed with 50 g of an organic resin (see Table 1) and mixed by stirring at room temperature. If a clear solution was obtained, compatibility was assessed as "positive".

TABLE 1

Results of studies 1a-3a

| | Study | | | |
|---|---|---|---|---|
| | 1a | 2a | 2b | 3a |
| Binder 1 | 50 | | | |
| Binder 2 | | 50 | 50 | |
| Binder 3 | | | | 50 |
| Setalux 1760 VB 64 | 50 | 50 | | 50 |
| Setalux 1767 VV-65 | | | 50 | |
| Compatibility | positive | positive | positive | positive |

Study of Compatibility of Noninventive Mixtures 4-7 with Organic Resins:

The components specified in Table 2 were mixed in the amounts specified by stirring at room temperature. If no clear solution was obtained, compatibility was assessed as "negative" (see Table 2).

TABLE 2

Results of the studies of the noninventive mixtures 4-7

| | Noninventive mixtures | | | |
|---|---|---|---|---|
| | 4 | 5 | 6 | 7 |
| Vestanat ® EP-M95 | | 50 | 40 | 25 |
| SILRES ® IC 368 | 50 | 25 | 20 | 25 |
| Setalux 1760 VB 64 | 50 | 25 | 40 | 50 |
| Compatibility | negative | negative | negative | negative |

It has been found that, surprisingly, the inventive binders 1-3 have better compatibility with organic resins than the mixtures of the individual components.

Production of Coating Compositions:

For the production of the inventive coating compositions I-VI, the products listed in Table 3 were homogenized at room temperature.

TABLE 3

Composition of the inventive coating compositions I-VI

| Item | I | II | III | IV | V | VI |
|---|---|---|---|---|---|---|
| Binder 1 | 33.93 | 99.01 | | | | |
| Binder 2 | | | 34.96 | 99.01 | | |
| Binder 3 | | | | | 47.13 | 98.62 |
| Setalux 1760 VB 64 | 52.99 | | 50.02 | | 51.55 | |
| Setalux 1767 VV-65 | | | | | | |
| Vestanat ® EP Cat 11B | 1.01 | 0.99 | 1.24 | 0.99 | 1.32 | 1.38 |
| Xylene | 12.07 | | 13.78 | | | |

To determine the paint properties, the inventive coating compositions I-VI were each applied with a 100 μm coating bar to sheets of the Gardobond S26 type and dried at 140° C. for 22 min.

TABLE 4

Properties of the inventive coatings obtained from the inventive coating compositions I-VI

| | Coatings formed from inventive coating compositions | | | | | |
|---|---|---|---|---|---|---|
| | I | II | III | IV | V | VI |
| Erichsen cupping [mm] (EN ISO 1520) | 4.3 | 4 | 5.5 | 4 | 5 | 3 |
| Pendulum hardness (König) [s] n 7 d | 159 | 91 | 159 | 58 | 148 | 83 |
| MEK test [ASTM D 4752] (twin rubs, applied weight 1 kg) | >150 | >150 | >150 | >150 | >150 | >150 |
| Visual assessment | glossy | glossy | glossy | glossy | glossy | glossy |

With the inventive coating compositions I-VI, it is possible to obtain nontacky, shiny coatings with good mechanical and chemical stability.

To assess weathering stability, coating compositions IV and VII were each applied with a 100 μm coating bar to an aluminium sheet which had been coated with a two-component polyurethane base coat, and dried at 140° C. for 22 min. After 7 days, the coated sheets were subjected to the UV-A weathering test according to DIN EN ISO 4892-3: 2014-1 (cycle number 1: 8 h under dry conditions with irradiation by UVA-340 lamps at 0.76 W/(m² nm) and condensation for 4 h without irradiation) for 250 h.

TABLE 5

Test of weathering stability in the UV-A test (according to DIN EN ISO 4892-3:2014-1)

| | Coatings comprising | | | |
|---|---|---|---|---|
| | Inventive coating composition IV | | Noninventive coating composition VII containing 99.01% mixture 4 and 0.99% Vestanat ® EP Cat 11B | |
| | QUV-A test duration | | | |
| | 0 h | 250 h | 0 h | 250 h |
| Gloss at 20° | 59 | 67 | 73 | 38 |
| Gloss at 60° | 89 | 90 | 84 | 73 |

The data from Table 5 demonstrate that the inventive coating composition IV comprising the inventive binder 2 exhibits better weathering stability than the noninventive coating composition VII, which already exhibits a significant loss of gloss after weathering for 250 h.

The invention claimed is:

1. A binder, comprising:
   a reaction product formed from an adduct (A) of an isocyanatoalkylalkoxysilane (A1) and an alcohol (A2) with an alkoxysilane-containing Q unit-free alkyl- and/or arylsilicone resin (B) comprising units of formula (I)

   $$R^3{}_c(R^4O)_dR^5{}_eSiO_{(4-c-d-e)/2} \qquad \text{formula (I)}$$

wherein
   $R^3$ may be the same or different and is a hydrogen atom, a monovalent, SiC-bonded, optionally halogen substituted aliphatic hydrocarbyl radical or a divalent, optionally halogen substituted, aliphatic hydrocarbyl radical that forms a bridge between two units of the formula (I),
   $R^4$ may be the same or different and is a hydrogen atom or a monovalent, optionally halogen substituted hydrocarbyl radical,
   $R^5$ may be the same or different and is a monovalent, SiC-bonded, optionally halogen substituted aromatic hydrocarbyl radical,
   c is 0, 1, 2 or 3,
   d is 0, 1, 2 or 3, and
   e is 0, 1 or 2,
   with the proviso that the sum total of c+d+e is greater than 0 and less than or equal to 3 and, in addition, c+e≥1
   wherein said silicone resin has at least 20% of units of formula (I) in which c is 0 and/or not more than 20% of units of formula (I) in which c is 2.

2. The binder according to claim 1, wherein
   the isocyanatoalkylalkoxysilane (A1) is at least one member selected from the group consisting of isocyanatomethyltrimethoxysilane, isocyanatomethyltriethoxysilane, isocyanatomethyltriisopropoxysilane, 2-isocyanatoethyltrimethoxysilane, 2-isocyanatoethyltriethoxysilane, 2-isocyanatoethyltriisopropoxysilane, 3-isocyanato-n-propyltrimethoxysilane, 3-isocyanato-n-propyltriethoxysilane, 3-isocyanato-n-propyltriisopropoxysilane, 4-isocyanato-n-butyltrimethoxysilane, 4-isocyanato-n-butyltriethoxysilane, and 4-isocyanato-n-butyltriisopropoxysilane.

3. The binder according to claim 1, wherein
   the alcohol (A2) is a mono- or polyhydric alcohol.

4. The binder according to claim 3, wherein
   the polyhydric alcohol is at least one member selected from the group consisting of ethylene glycol, propane-1,2-diol, propane-1,3-diol, butane-1,4-diol, pentane-1,5-diol, hexane-1,6-diol, decane-1,10-diol, dodecane-1,12-diol, glycerol, isosorbitol, isomannitol, isoiditol, 2,2,4-trimethylhexane-1,6-diol and 2,4,4-trimethylhexane-1,6-diol, alone or as any desired mixtures of these isomers, 2,2-dimethylbutane-1,3-diol, 2-methylpentane-2,4-diol, 3-methylpentane-2,4-diol, 2,2,4-trimethyl-1-pentane-1,3-diol, 2-ethylhexane-1,3-diol, 2,2-dimethylhexane-1,3-diol, 3-methylpentane-1,5-diol, 2-methylpentane-1,5-diol, 2,2-dimethylpropane-1,3-diol (neopentyl glycol), neopentyl glycol hydroxypivalate, polyethylene glycol, polypropylene glycol, sorbitol, pentaerythritol, 1,1,1-trimethylolpropane, 3(4),8(9)-bis(hydroxymethyl)tricyclo[5.2.1.02,6] decane (dicidol), and 2,2-bis(4-hydroxycyclohexyl) propane.

5. The binder according to claim 1, wherein
   the molar ratio of OH groups in the alcohols (A2) to NCO groups in the isocyanatoalkyltrialkoxysilane (A1) is 0.8:1 to 1.2:1.

6. A process for preparing the binder according to claim 1, the process comprising:
   reacting an adduct (A) formed from an isocyanatoalkylalkoxysilane (A1) and an alcohol (A2) with an alkoxysilane-containing alkyl- and/or arylsilicone resin (B), optionally in the presence of a catalyst (C), an alcohol (D), and/or water.

7. The process according to claim 6, wherein said reacting is conducted at temperatures in the range of 30-150° C.

8. The process according to claim 6, wherein
   the catalysts (C) is present and is at least one member selected from the group consisting of a carboxylic acid having a melting point of >60° C., a tetraalkylammonium carboxylate, a metal complex with a chelate ligand, an organic Sn(IV) compound, an organic Sn(II) compound, an organic Zn compound, an organic Bi compound, a tertiary amine, a phosphorus-containing catalyst, a phosphorus- and nitrogen-containing catalyst, an organic sulphonic acid in unblocked form, an organic sulphonic acid in blocked form, and a mixture thereof.

9. The process according to claim 6, wherein
adduct (A) and the alkoxysilane-containing alkyl- and/or arylsilicone resin (B) are present in the same weight ratio.

10. A coating composition, comprising:
I) at least one binder according to claim 1,
II) optionally one or more additional binder components,
III) optionally a catalyst,
IV) optionally an auxiliary and an additive,
V) optionally an organic solvent, and
VI) optionally an aminosilane.

11. The coating composition according to claim 10, wherein
said catalyst (III) is present and is at least one member selected from the group consisting of a Lewis acid, a metal or transition metal chelate, a metal or transition metal salt, a metal or transition metal particle, a sulphonic acid in free form, a sulphonic acid in neutralized form, a sulphonic acid in adduct form, phosphoric acid, a phosphorous acid, a derivative of a phosphoric acid, a derivative of a phosphorous acid, a high-boiling acid, a quaternary ammonium carboxylate, and a mixture thereof.

12. A paint, an adhesive, or a sealant, which comprises the binder according to claim 1.

13. A process of making a paint, an adhesive, or a sealant, the process comprising:
adding a binder according to claim 1 to a paint composition, an adhesive composition, or a sealant composition.

14. A process of making a coated article, the processing comprising:
coating an article with the coating composition according to claim 10, thereby obtaining the coated article.

15. The binder according to claim 1, wherein said silicone resin (B) has a viscosity range of 10-100,000 mPas.

16. The binder according to claim 1, wherein said silicon resin (B) has a ratio of (T) to (D) units of 0.5 to 2.0.

* * * * *